(12) United States Patent
Jung et al.

(10) Patent No.: US 12,272,497 B2
(45) Date of Patent: Apr. 8, 2025

(54) MULTILAYER ELECTRONIC COMPONENT

(71) Applicant: SAMSUNG ELECTRO-MECHANICS CO., LTD., Suwon-si (KR)

(72) Inventors: Hee Jung Jung, Suwon-si (KR); Jun Il Kang, Suwon-si (KR); Jong Rock Lee, Suwon-si (KR); Chung Yeol Lee, Suwon-si (KR); Cheong Kim, Suwon-si (KR); Jin Hyung Lim, Suwon-si (KR); Hiroki Okada, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 83 days.

(21) Appl. No.: 18/138,906

(22) Filed: Apr. 25, 2023

(65) Prior Publication Data

US 2024/0212936 A1    Jun. 27, 2024

(30) Foreign Application Priority Data

Dec. 23, 2022    (KR) .................. 10-2022-0183347

(51) Int. Cl.
*H01G 4/232*    (2006.01)
*H01G 4/30*    (2006.01)

(52) U.S. Cl.
CPC ............ *H01G 4/2325* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 2008/0118721 A1* | 5/2008 | Horie | H01C 7/18 428/209 |
| 2016/0086733 A1* | 3/2016 | Saito | H01G 4/1227 205/183 |
| 2018/0182552 A1 | 6/2018 | Sawada et al. | |
| 2021/0020370 A1 | 1/2021 | Yoshino et al. | |
| 2023/0207206 A1* | 6/2023 | Jung | H01G 4/30 361/301.4 |

FOREIGN PATENT DOCUMENTS

| | | |
|---|---|---|
| KR | 10-2018-0073487 A | 7/2018 |
| KR | 10-2021-0010327 A | 1/2021 |

* cited by examiner

*Primary Examiner* — Eric W Thomas
(74) *Attorney, Agent, or Firm* — Morgan, Lewis & Bockius LLP (57) ABSTRACT

A multilayer electronic component according to an embodiment of the present disclosure includes a body including a dielectric layer and internal electrodes; and an external electrode disposed on the body and including an electrode plating layer disposed to at least partially contact the internal electrodes, and a plating layer disposed on the electrode plating layer. The electrode plating layer may include a plurality of first crystal grains having a major axis of 0.2 μm or more, and the plurality of first crystal grains may have an average ratio of a major diameter to a minor axis to 1:1 to 3:1.

20 Claims, 7 Drawing Sheets

MULTILAYER ELECTRONIC COMPONENT

CROSS-REFERENCE TO RELATED APPLICATION(S)

This application claims benefit of priority to Korean Patent Application No. 10-2022-0183347 filed on Dec. 23, 2022 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, may be a chip-type condenser mounted on the printed circuit boards of any of various electronic products, such as an imaging device, including a liquid crystal display (LCD) or a plasma display panel (PDP), a computer, a smartphone, or a mobile phone, serving to charge or discharge electricity therein or therefrom.

Such a multilayer ceramic capacitor has a small size, implements high capacitance, and is easily mounted on a circuit board, and may thus be used as a component of various electronic devices. There has been increasing demand for a multilayer ceramic capacitor to have a reduced size and higher capacitance as each of various electronic devices such as a computer and a mobile device have a reduced size and higher output. In addition, as the application thereof to electronic parts for automobiles has increased, high reliability in various environments is required.

To achieve miniaturization and high capacitance of a multilayer ceramic capacitor, it is necessary to improve capacitance per unit volume of the multilayer ceramic capacitor by minimizing a volume of the external electrode. Therefore, there is a need for a method capable of improving reliability while minimizing the volume of the external electrode.

SUMMARY

An aspect of the present disclosure is to provide a multilayer electronic component having excellent reliability.

An aspect of the present disclosure is to provide a multilayer electronic component having improved capacitance per unit volume.

However, the object of the present invention is not limited to the above, and will be more easily understood in the process of describing specific embodiments of the present disclosure.

According to an aspect of the present disclosure, a multilayer electronic component may include: a body including a dielectric layer and internal electrodes; and an external electrode disposed on the body and including an electrode plating layer disposed to at least partially contact the internal electrode and a plating layer disposed on the electrode plating layer. The electrode plating layer may include a plurality of first crystal grains having a major axis of 0.2 μm or more, and the plurality of first crystal grains may have an average ratio of a major axis to a minor axis of 1:1 to 3:1.

According to an aspect of the present disclosure, a multilayer electronic component may include: a body including a dielectric layer and internal electrodes; and an external electrode disposed on the body and including a base electrode layer disposed to at least partially contact the internal electrodes, an electrode plating layer disposed on the base electrode layer, and a plating layer disposed on the electrode plating layer. An area occupied by metal among the base electrode layers may be 90% or more, the electrode plating layer may include a plurality of first crystal grains having a major axis of 0.2 μm or more, and the plurality of first crystal grains may have an average ratio of a major axis to a minor axis of 1:1 to 3:1.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, embodiments of the present disclosure will be described as follows with reference to the attached drawings. The disclosure may, however, present be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may further include other components as well, rather than excluding other components, unless specifically stated otherwise.

In the drawings, a first direction may refer to a laminating direction or a thickness (T) direction, a second direction may refer to a length (L) direction, and a third direction may refer to a width (W) direction.

Multilayer Electronic Component

Figure 1:
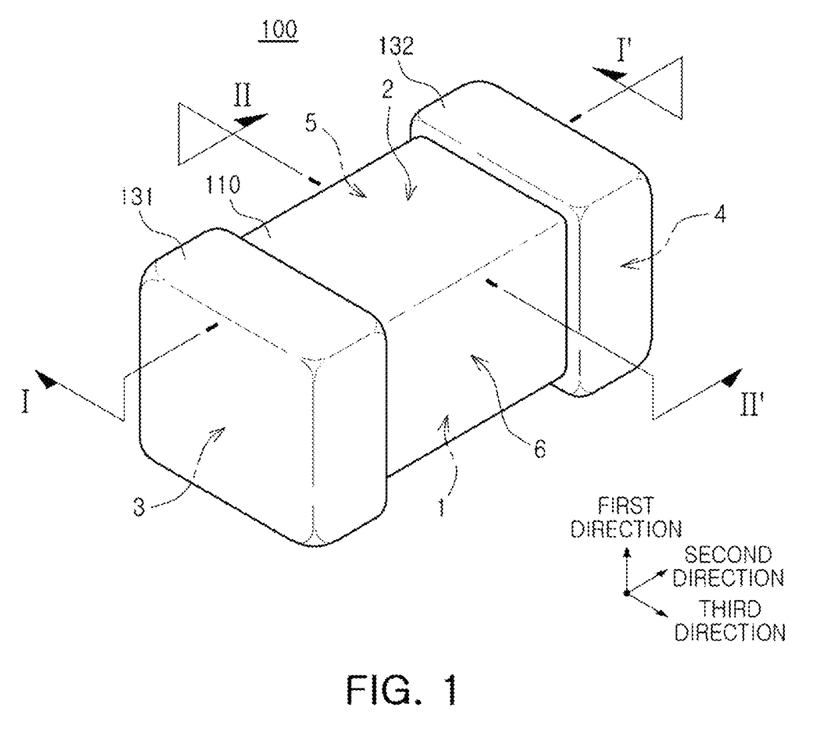
FIG. 1 schematically illustrates a perspective view of a multilayer electronic component according to an embodiment of the present disclosure.

FIG. 1 schematically illustrates a perspective view of a multilayer electronic component according to an embodiment of the present disclosure.

Figure 2:
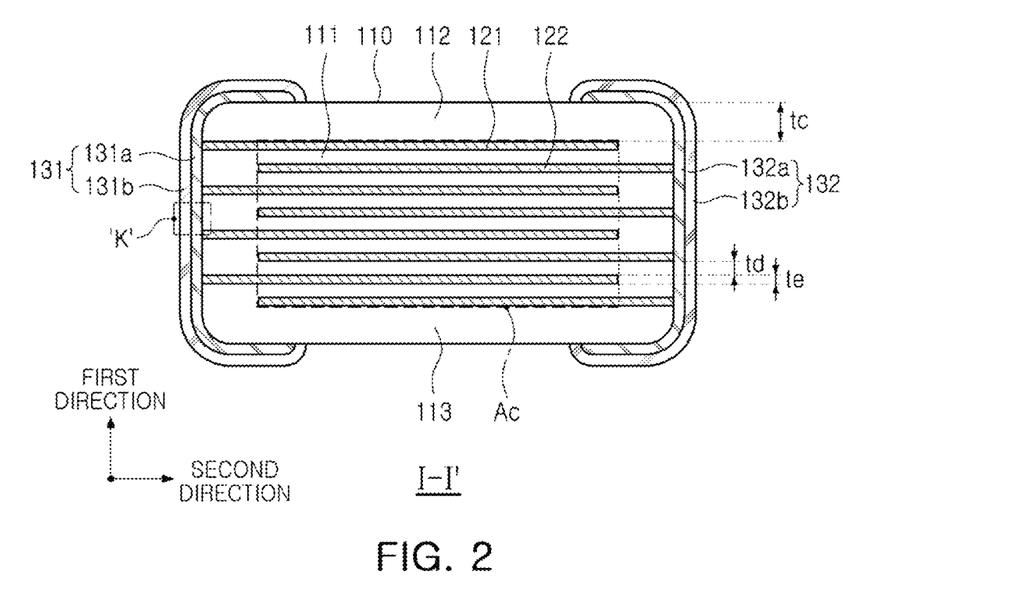
FIG. 2 is a schematic cross-sectional view taken along line I-I' of FIG. 1.

FIG. 2 is a schematic cross-sectional view taken along line I-I' of FIG. 1.

Figure 3:
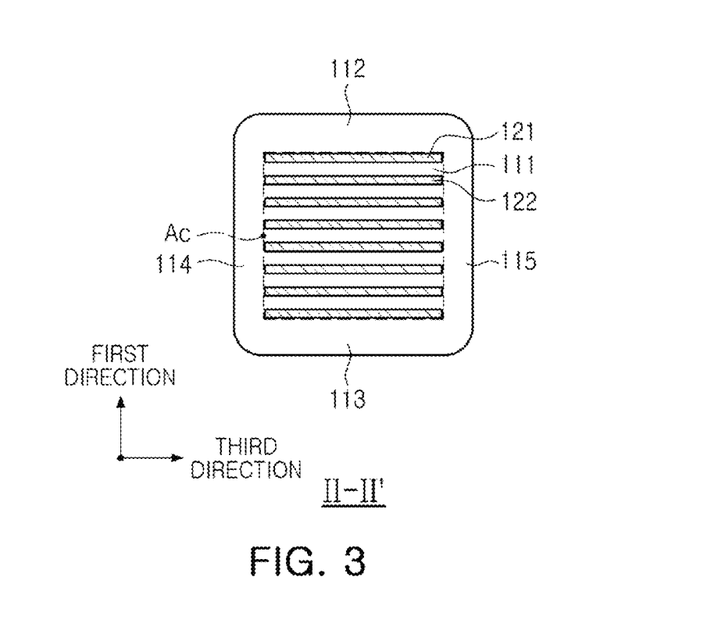
FIG. 3 is a schematic cross-sectional view taken along line II-II' of FIG. 1.

FIG. 3 is a schematic cross-sectional view taken along line II-II' of FIG. 1.

Figure 4:
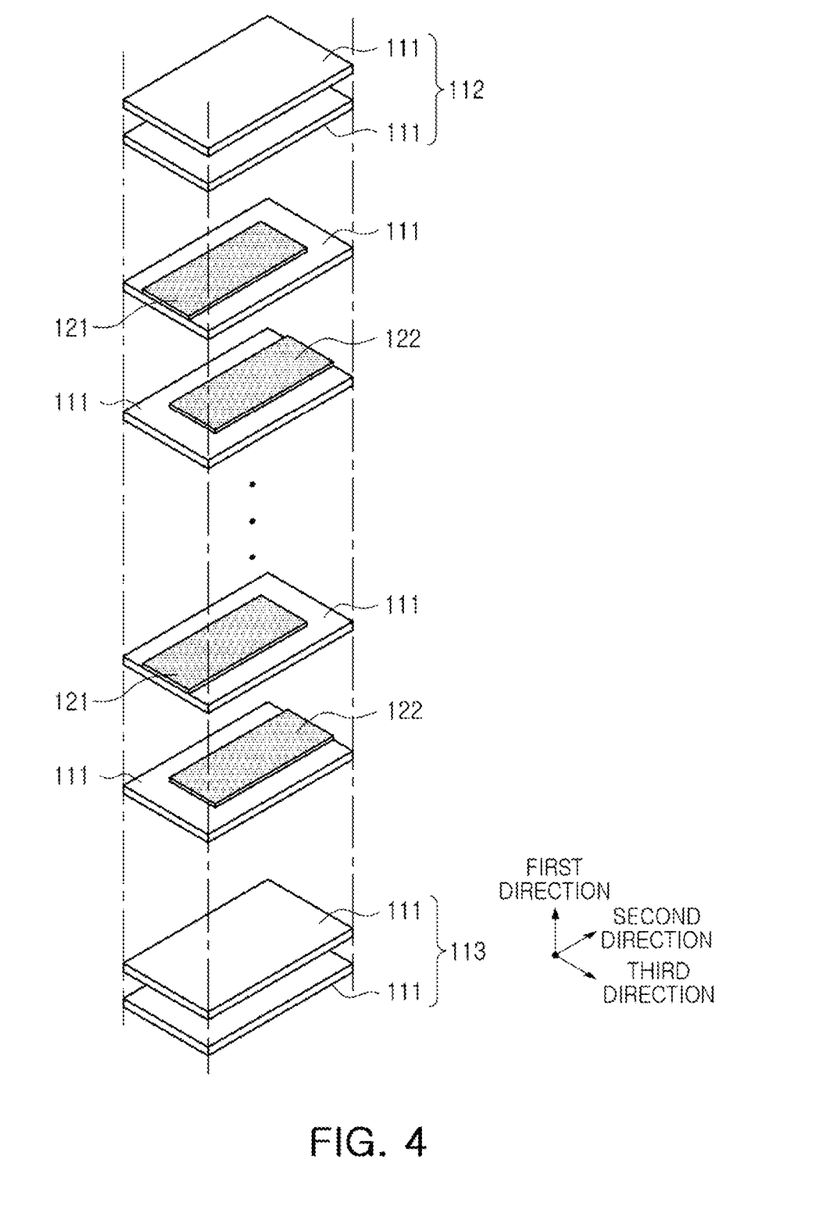
FIG. 4 is an exploded perspective view schematically illustrating an exploded body of FIG. 1.

FIG. 4 is an exploded perspective view schematically illustrating an exploded body of FIG. 1.

Figure 5:
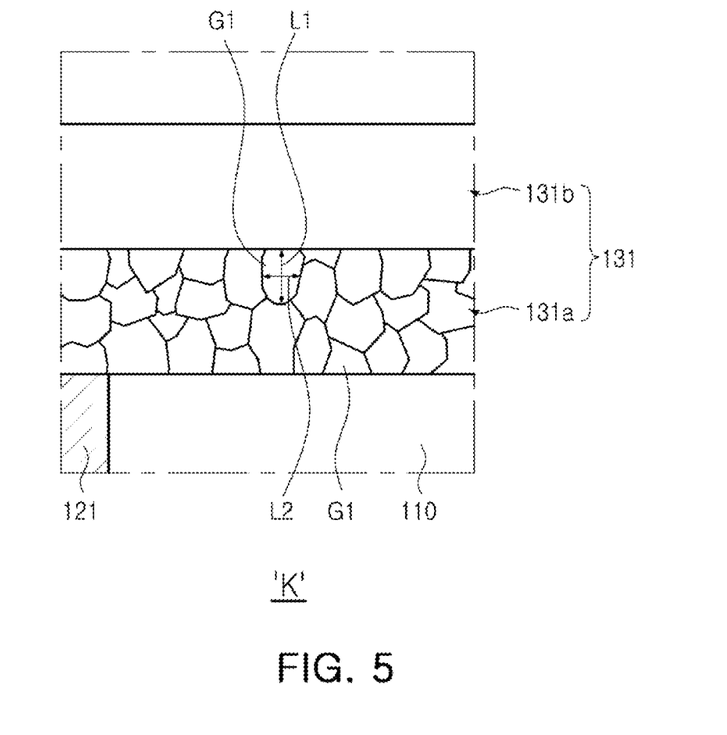
FIG. 5 is an enlarged view of region K of FIG. 2.

FIG. 5 is an enlarged view of region K of FIG. 2.

Hereinafter, a multilayer electronic component 100 according to an embodiment in the present disclosure will be described with reference to FIGS. 1 to 5. In addition, a multilayer ceramic capacitor (hereinafter referred to as 'MLCC') will be described as an example of a multilayer electronic component, but the present disclosure is not limited thereto, and it may also be applied to various multilayer electronic components such as an inductor and piezoelectric elements, varistors, thermistors, or the like.

According to an aspect of the present disclosure, the multilayer electronic component 100 may include: a body 110 including a dielectric layer 111 and internal electrodes 121 and 122; and external electrodes 131 and 132 disposed on the body and including electrode plating layers 131a and 132a disposed to at least partially contact the internal electrodes and plating layers 131b and 132b disposed on the electrode plating layers 131a and 131b. The electrode plating layers 131a and 132a may include a plurality of first crystal grains G1 having a major axis of 0.2 μm or more, and the plurality of first crystal grains G1 may have an average ratio of the major axis L1 to the minor axis L2 of 1:1 to 3:1.

In order to achieve miniaturization and high capacitance of the multilayer ceramic capacitor, it is necessary to improve capacitance per unit volume of the multilayer ceramic capacitor by minimizing a volume of the external electrode. The external electrode generally includes an electrode layer and a plating layer disposed on the electrode layer, and the electrode layer was formed by dipping a body in a paste for external electrodes containing conductive metal and glass and sintering the same. However, since the electrode layer formed by the dipping method was generally formed to have a thickness of about 30 μm, so it was difficult to improve the capacitance per unit volume of the multilayer ceramic capacitor.

Accordingly, a method of minimizing a volume of the external electrode is being studied by excluding an electrode layer formed by the dipping method in order to minimize a volume of the external electrode, or replacing the electrode layer formed by the dipping method with a thin base electrode layer to reduce a thickness of the external electrode. However, as the thickness of the external electrode is reduced, permeation and accumulation of hydrogen generated during plating may be facilitated, and reliability may be deteriorated.

On the other hand, according to the present disclosure, the electrode plating layers 131a and 132a may include a plurality of first crystal grains G1 having a major axis L1 of 0.2 μm or more, and as an average ratio of the major axis L1 to the minor axis L2 of the plurality of first crystal grains G1 satisfies 1:1 to 3:1, hydrogen permeation may be suppressed and reliability of the multilayer electronic component may be improved.

Hereinafter, each component included in the multilayer electronic component 100 according to an embodiment of the present disclosure will be described.

The body 110 has a dielectric layer 111 and internal electrodes 121 and 122, alternately stacked therein.

The body 110 is not limited to a particular shape, and may have a hexahedral shape or a shape similar to the hexahedral shape, as illustrated in the drawings. The body 110 may not have a hexahedral shape having perfectly straight lines because ceramic powder particles included in the body 110 are contracted in a process in which the body is sintered. However, the body 110 may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4, and opposing each other in a third direction.

In an embodiment, the body 110 may have a 1-3 corner (c1-3) connecting the first and third surfaces 1 and 3, a 1-4 corner (c1-4) connecting the first and fourth surfaces 1 and 4, a 2-3 corner (c2-3) connecting the second and third surfaces 2 and 3, and a 2-4 corner (c2-4) connecting the second and fourth surfaces 2 and 4, and the 1-3 corner and the 2-3 corner may have a form contracted to a center of the body 110 in the first direction, toward the third surface 3, and the 1-4 corner and the 2-4 corner may have a form contracted to a center of the body 110 in the first direction, toward the fourth surface 4.

As a margin region, in which the internal electrodes 121 and 122 are not disposed, overlaps the dielectric layer 111, a step may be formed by thicknesses of the internal electrodes 121 and 122, so that a corner connecting the first surface 1 to the third to fifth surfaces 3 to 5 and/or a corner connecting the second surface 2 to the third to fifth surfaces 3 to 5 may have a shape contracted to a center of the body 110 in the first direction when viewed with respect to the first surface 1 or the second surface 2. Alternatively, by contraction behavior during a sintering process of the body 110, a corner connecting the first surface 1 to the third to sixth surfaces 3 to 6 and/or a corner connecting the second surface 2 to the third to sixth surfaces 3 to 6 may have a shape contracted to a center of the body 110 in the first direction when viewed with respect to the first surface 1 or the second surface 2. Alternatively, as a corner connecting respective surfaces of the body 110 to each other is rounded by performing an additional process to prevent chipping defects, or the like, a corner connecting the first surface 1 to the third to sixth surfaces 3 to 6 and/or a corner connecting the second surface 2 to the third to sixth surfaces 3 to 6 may have a rounded shape.

The corner may include a 1-3 corner connecting the first surface 1 and the third surface 3, a 1-4 corner connecting the first surface 1 and the fourth surface 4, a 2-3 corner connecting the second surface 2 and the third surface 4, and a 2-4 corner connecting the second surface 2 and the fourth surface 4. In addition, the corner may include a 1-5 corner connecting the first surface 1 and the fifth surface 5, a 1-6 corner connecting the first surface 1 and the sixth surface 6, a 2-5 corner connecting the second surface 2 and the fifth surface 5, and a 2-6 corner connecting the second surface 2 and the sixth surface 6. The first to sixth surfaces 1, 2, 3, 4, 5, and 6 of the body 110 may be overall planar surfaces, and non-planar regions may be corners. Hereinafter, an extension line of each surface may refer to a line extending based on a planar portion of each surface.

Meanwhile, in order to suppress a step formed by the internal electrodes 121 and 122, after the internal electrodes are cut so as to be exposed to the fifth and sixth surfaces 5 and 6 of the body after lamination, when margin portions 114 and 115 are formed by laminating a single dielectric layer or two or more dielectric layers on both side surfaces of the capacitance formation portion Ac in a third direction (width direction), a portion connecting the first surface to the fifth and sixth surfaces and a portion connecting the second surface to the fifth and sixth surfaces may not have a contracted form.

A plurality of dielectric layers 111 forming the body 110 may be in a sintered state, and adjacent dielectric layers 111 may be integrated with each other, such that boundaries therebetween may not be readily apparent without a scanning electron microscope (SEM).

According to an embodiment of the present disclosure, a raw material for forming the dielectric layer 111 is not particularly limited, as long as sufficient electrostatic capacitance may be obtained therewith. For example, the raw material for forming the dielectric layer 111 may be a barium titanate ($BaTiO_3$)-based material, a lead composite perovskite-based material, a strontium titanate ($SrTiO_3$)-based material, or the like. The barium titanate-based material may include $BaTiO_3$-based ceramic powder, and the ceramic powder may be, for example, $BaTiO_3$, $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, in which calcium (Ca), zirconium (Zr), or the like, are partially dissolved in $BaTiO_3$, and the like.

In addition, a raw material of the dielectric layer 111 may include various ceramic additives, organic solvents, binders, dispersants, and the like, added to powder particles such as barium titanate ($BaTiO_3$) powder particles, or the like, according to an object of the present disclosure.

Meanwhile, a thickness of the dielectric layer 111 is not particularly limited.

However, in general, when the dielectric layer is formed to have a thickness of less than 0.6 μm, in particular, when the thickness of the dielectric layer is 0.35 μm or less, there was a concern that reliability may be deteriorated.

According to an embodiment of the present disclosure, the electrode plating layers 131a and 132a may include a plurality of first crystal grains G1 having major axis L1 of 0.2 μm or more, and as an average ratio of the major axis L1 to a minor axis L2 of the plurality of first crystal grains G1 satisfies 1:1 to 3:1, hydrogen permeation may be suppressed, so that excellent reliability may be secured even when an average thickness "td" of at least one of the plurality of dielectric layers 111 is 0.35 μm or less.

Therefore, when the average thickness "td" of at least one of the plurality of dielectric layers 111 is 0.35 μm or less, a reliability improvement effect according to the present disclosure may be more remarkable.

The average thickness "td" of the dielectric layer 111 may mean an average thickness of the dielectric layer 111 disposed between the first and second internal electrodes 121 and 122 in the first direction.

The average thickness of the dielectric layer 111 may be measured from an image obtained by scanning a cross-section of the body 110 in length and thickness directions (L-T directions) with a scanning electron microscope (SEM) with a magnification of 10,000. More specifically, an average value may be measured by measuring a thickness of one dielectric layer at 30 equally spaced points in the length direction from the scanned image. The 30 points having equal intervals may be designated in the capacitance formation portion Ac. In addition, if the average value is measured by extending the average value measurement to 10 dielectric layers, the average thickness of the dielectric layers can be more generalized.

The body 110 may include a capacitance formation portion Ac disposed in the body 110, and including a first internal electrode 121 and a second internal electrode 122 disposed to oppose each other with the dielectric layer 111 interposed therebetween and having capacitance formed therein, and cover portions 112 and 113 formed above and below the capacitance formation portion Ac in the first direction.

In addition, the capacitance formation portion Ac is a portion serving to contribute to capacitance formation of a capacitor, and may be formed by repeatedly laminating a plurality of first and second internal electrodes 121 and 122 with a dielectric layer 111 interposed therebetween.

The cover portions 112 and 113 may include an upper cover portion 112 disposed above the capacitance formation portion Ac in the first direction, and a lower cover portion 113 disposed below the capacitance formation portion Ac in the first direction.

The upper cover portion 112 and the lower cover portion 113 may be formed by laminating a single dielectric layer or two or more dielectric layers on the upper and lower surfaces of the capacitance formation portion Ac in a thickness direction, respectively, and the upper cover portion 112 and the lower cover portion 113 may serve to basically prevent damage to the internal electrodes due to physical or chemical stress.

The upper cover portion 112 and the lower cover portion 113 may not include internal electrodes, and may include the same material as that of the dielectric layer 111.

That is, the upper cover portion 112 and the lower cover portion 113 may include a ceramic material, for example, a barium titanate ($BaTiO_3$)-based ceramic material.

Meanwhile, a thickness of the cover portions 112 and 113 need not be particularly limited. However, a thickness "tc" of the cover portions 112 and 113 may be 15 μm or less in order to more easily achieve miniaturization and high capacitance of the multilayer electronic component.

The average thickness "tc" of the cover portions 112 and 113 may mean a size thereof in the first direction, and may be a value obtained by averaging sizes of the cover portions 112 and 113 measured in the first direction at five points having equal intervals above or below the capacitance formation portion Ac.

In addition, margin portions 114 and 115 may be disposed on a side surface of the capacitance formation portion Ac.

The margin portions 114 and 115 may include a first margin portion 114 disposed on the fifth surface 5 of the body 110 and a second margin portion 115 disposed on the sixth surface 6 thereof. That is, the margin portions 114 and 115 may be disposed on both end surfaces of the body in a width direction.

The margin portions 114 and 115 may mean a region between both ends of the first and second internal electrodes 121 and 122 and an interface of the body 110 in a cross-section of the body 110 taken in a width-thickness (W-T) direction, as illustrated in FIG. 3.

The margin portions 114 and 115 may basically serve to prevent damages to the internal electrodes due to physical or chemical stresses.

The margin portions 114 and 115 may be formed by applying a conductive paste to the ceramic green sheet, except where margin portions are to be formed, to form an internal electrode.

In addition, in order to suppress a step by the internal electrodes 121 and 122, after the internal electrodes are cut so as to be exposed to the fifth and sixth surfaces 5 and 6 of the body after lamination, the margin portions 114 and 115 may also be formed by laminating a single dielectric layer or two or more dielectric layers on both side surfaces of the capacitance formation portion Ac in the third direction (width direction).

Meanwhile, a width of the margin portions 114 and 115 is not particularly limited. However, in order to more easily implement miniaturization and high capacitance of the multilayer electronic component, an average width of the margin portions 114 and 115 may be 15 µm or less.

The average width of the margin portions 114 and 115 may mean an average size of the margin portions 114 and 115 in a third direction, and may be a value obtained by averaging sizes of the margin portions 114 and 115 measured at five points at equal intervals in the third direction in terms of the capacitance formation portion Ac.

Accordingly, in an embodiment, an average size of a region in which the internal electrodes 121 and 122 are spaced apart from the fifth and sixth surfaces in the third direction may be 15 µm or less, respectively.

The internal electrodes 121 and 122 may include first and second internal electrodes 121 and 122. The first and second internal electrodes 121 and 122 may be alternately disposed to oppose each other with the dielectric layer constituting the body 110 interposed therebetween, and may be exposed to the third and fourth surfaces 3 and 4 of the body 110, respectively.

The first internal electrode 121 may be spaced apart from the fourth surface 4 and exposed through (or be in contact with or extend from) the third surface 3, and the second internal electrode 122 may be spaced apart from the third surface 3 and exposed through (or be in contact with or extend from) the fourth surface 4. A first external electrode 131 may be disposed on the third surface 3 of the body to be connected to the first internal electrode 121, and a second external electrode 132 may be disposed on the fourth surface 4 of the body to be connected to the second internal electrode 122.

That is, the first internal electrode 121 is not connected to the second external electrode 132, but is connected to the first external electrode 131, and the second internal electrode 122 is not connected to the first external electrode 131, but is connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance. In addition, the first and second internal electrodes 121 and 122 may be spaced apart from the fifth and sixth surfaces 5 and 6 of the body 110.

In this case, the first and second internal electrodes 121 and 122 may be electrically isolated from each other by the dielectric layer 111 disposed in a middle.

The body 110 may be formed by alternately laminating a ceramic green sheet on which the first internal electrode 121 is printed and a ceramic green sheet on which the second internal electrode 122 is printed, followed by sintering.

A material for forming the internal electrodes 121 and 122 is not particularly limited, and as the material, a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for the internal electrodes including at least one of nickel (Ni), copper (Cu), palladium (Pd), silver (Ag), gold (Au), platinum (Pt), tin (Sn), tungsten (W), titanium (Ti) and an alloy thereof on a ceramic green sheet. A method for printing the conductive paste for the internal electrodes may be a screen printing method or a gravure printing method, but the present disclosure is not limited thereto.

Meanwhile, a thickness of the internal electrodes 121 and 122 does not need to be particularly limited.

However, in general, when the internal electrode is thinly formed to have a thickness of less than 0.6 µm, in particular, when the thickness of the internal electrode is 0.35 µm or less, there may be a concern that reliability is deteriorated.

According to an embodiment of the present disclosure, the electrode plating layers 131a and 132a include a plurality of first crystal grains G1 having a major axis L1 of 0.2 µm or more, and as an average ratio of the major axis L1 to a minor axis L2 of the plurality of first crystal grains G1 satisfies 1:1 to 3:1, hydrogen permeation can be suppressed, so that excellent reliability may be secured even when an average thickness "te" of at least one of the plurality of internal electrodes 121 and 122 is 0.35 µm or less.

Accordingly, when at least one of the internal electrodes 121 and 122 have an average thickness "te" of 0.35 µm or less, an effect according to the present disclosure may be more remarkable, and miniaturization and high capacitance of the multilayer electronic component may be more easily achieved.

The average thickness "te" of the internal electrodes 121 and 122 may mean an average size of the internal electrodes 121 and 122 in the first direction.

The average thickness of the internal electrodes 121 and 122 may be measured by scanning an image of a cross-section of the body 110 in length and thickness directions (L-T directions) with a scanning electron microscope (SEM) with a magnification of 10,000. More specifically, an average value may be measured by measuring a thickness of one dielectric layer at 30 equally spaced points in the length direction from the scanned image. The 30 points having equal intervals may be designated in the capacitance formation portion Ac. In addition, if the average value is measured by extending the average value measurement to 10 internal electrodes, the average thickness of the internal electrodes can be more generalized.

External electrodes 131 and 132 may be disposed on the third surface 3 and the fourth surface 4 of the body 110.

The external electrodes 131 and 132 may include first and second external electrodes 131 and 132 respectively disposed on the third and fourth surfaces 3 and 4 of the body 110, to be respectively connected to the first and second internal electrodes 121 and 122.

Meanwhile, in the present embodiment, a structure in which the multilayer electronic component 100 has two external electrodes 131 and 132 is described. However, the number and shape of the external electrodes 131 and 132 may be changed according to the shape of the internal electrodes 121 and 122 or other purposes.

The external electrodes 131 and 132 may be disposed on the body 110 and may include plating electrode layers 131a and 132a disposed to at least partially contact the internal electrodes 121 and 122 and plating layers 131b and 132b disposed on the electrode plating layers 131a and 132a.

The first plating electrode layer 131a may be disposed to at least partially contact the first internal electrode 121, and the second plating electrode layer 132a may be disposed to at least partially contact the second internal electrode 122. A first plating layer 131b may be disposed on the first plating electrode layer 131a, and a second plating layer 132b may be disposed on the second plating electrode layer 132a.

The electrode plating layers 131a and 132a include a plurality of first crystal grains G1 having a major axis L1 of 0.2 μm or more, and an average ratio of the major axis L1 to a minor axis L2 of the plurality of first crystal grains G1 may be 1:1 to 3:1.

As the electrode plating layers 131a and 132a include a plurality of first crystal grains G1 having a major axis L1 of 0.2 μm or more and an average ratio of the major axis L1 to the minor axis L2 of 1:1 to 3:1, the first crystal grains G1 may have a rounded shape and suppress hydrogen permeation into the body 110. Specifically, it is possible to minimize an influence of hydrogen inevitably generated during the plating process, and accordingly, it is possible to improve IR characteristics.

When the major axis L1 of the crystal grain is less than 0.2 μm or the major axis L1 exceeds three times the minor axis L2, hydrogen easily permeates into the body 110 and reliability may be deteriorated. When the major axis L1 exceeds than 3 times the minor axis L2, crystal grains may be observed in a needle-shaped form.

Therefore, it is preferable that the electrode plating layers 131a and 132a include a plurality of first crystal grains G1 having a major axis L1 of 0.2 μm or more and an average ratio of the major axis L1 to the minor axis L2 of 1:1 to 3:1. More preferably, the electrode plating layers 131a and 132a may include a plurality of first crystal grains G1 having a major axis L1 of 0.3 μm or more and an average ratio of the major axis L1 to the minor axis L2 of 1:1 to 2:1. An upper limit of the major axis L1 of the first crystal grain G1 is not particularly limited, and may be 2 μm or less.

Meanwhile, since the major axis L1 means a maximum diameter of a crystal grain, a minimum value of a ratio between the major axis L1 and the minor axis L2 of the crystal grain is 1:1. In addition, the major axis of the crystal grain means a maximum diameter penetrating through an inside of a crystal grain. In addition, the minor axis of the crystal grain means a maximum diameter measured in a direction, perpendicular to a measurement direction of the major axis. However, as the major axis of the crystal grains, when there are two or more maximum diameters penetrating the inside thereof of the same length, any arbitrary one may be regarded as a major axis, and a minor axis may be measured in the same manner as described above FIG. 5 is an enlarged view of region K of FIG. 2.

As illustrated in FIG. 5, with respect to the first crystal grain G1 in the first plating electrode layer 131a, a major axis L1, a maximum diameter penetrating through an inside thereof, and a minor axis L2, a maximum diameter measured in a direction, perpendicular to a measurement direction of the major axis, so that a ratio of the major axis to the minor axis L1:L2 may be obtained.

More specifically, being polished to a center of the multilayer electronic component in a third direction, to expose a cross-section of the electrode plating layers 131a and 132a in the first and second directions, an image obtained by scanning the cross-section with a scanning electron microscope (SEM) may be analyzed to measure major and minor axes of crystal grains. After measuring a major axis and a minor axis for 10 crystal grains in an order of the largest crystal grains in the image, an average value for a ratio of the major axis to the minor axis may be obtained, and an average ratio of the major axis to the minor axis of the crystal grains may be obtained.

In an embodiment, the plurality of first crystal grains G1 having a major axis L1 of 0.2 μm or more in a 10 μm×2 μm region of the cross-section of the electrode plating layers 131a and 132a is 10 or more, and the 10 or more first crystal grains G1 may have an average ratio of the major axis L1 and the minor axis L2 of 1:1 to 3:1. Accordingly, an effect of suppressing permeation of hydrogen into the body 110 can be further improved. In this case, cross-sections of the electrode plating layers 131a and 132a may be cross-sections in the first and second directions.

In addition, more preferably, the plurality of first crystal grains G1 having a major axis L1 of 0.3 μm or more in a 10 μm×2 μm region of the cross-sections of the electrode plating layers 131a and 132a may be 10 or more, and the first 10 or more first crystal grains G1 may have an average ratio of the major axis L1 to the minor axis L2 of 1:1 to 2:1.

In an embodiment, a ratio of the number of the first crystal grains G1 among the crystal grains included in the electrode plating layers 131a and 132a may be 50% or more. Accordingly, the effect of suppressing the permeation of hydrogen into the body 110 can be further improved.

In an embodiment, the first crystal grain G1 may be an Ni crystal grain. Accordingly, the effect of suppressing the permeation of hydrogen into the body 110 can be further improved. However, an embodiment thereof is not limited thereto, and the first crystal grain G1 may include at least one of Ni, Cu, Sn, Pd, and alloys thereof.

In an embodiment, an average size of crystal grains included in the electrode plating layers 131a and 132a may be 0.3 μm or more and 1.5 μm or less. If the average size of the crystal grains included in the electrode plating layers 131a and 132a is less than 0.3 μm, a problem may occur in stress of a plating film, and if the average size of the crystal grains included in the electrode plating layers 131a and 132a exceeds 1.5 μm, a hydrogen permeation path may be shortened, resulting in product performance deterioration, and reduced hardness, which may cause a problem of adversely affecting mechanical properties. Here, the size of the crystal grain may mean a value obtained by dividing the sum of the major axis and the minor axis of the corresponding crystal grain by 2, and the average size of the crystal grain may mean a value obtained by averaging the sizes of each of the crystal grains.

In an embodiment, an average thickness of the electrode plating layers 131a and 132a may be 1 μm or more and 10 μm or less. When the average thickness of the electrode plating layers 131a and 132a is less than 1 μm, a hydrogen permeation problem may occur due to insufficient Ni coverage, and when the average thickness of the electrode plating layers 131a and 132a exceeds 10 μm, there may be a concern that an effect of improving capacitance per unit volume is insufficient.

After being polished to a center of the multilayer electronic component in a third direction, to expose a cross-section of the electrode plating layers 131a and 132a in the first and second directions, an average thickness of the electrode plating layers 131a and 132a may be measured by analyzing an image obtained by scanning the cross-section with a scanning electron microscope (SEM). Specifically, it can be measured by obtaining an average value for each thickness of 10 equally spaced points in the image.

In an embodiment, the electrode plating layers 131a and 132a may be formed using a periodic pulse reverse (PPR) plating method.

A method of forming the electrode plating layers 131a and 132a is not particularly limited, but the electrode plating layers 131a and 132a include a plurality of first crystal grains G1 having a major axis L1 of 0.2 μm or more, and in order to easily control an average ratio of the major axis L1 to a minor axis L2 of the plurality of first crystal grains G1 to satisfy 1:1 to 3:1, it may be preferable that periodic pulse reverse (PPR) is applied.

Figure 6:
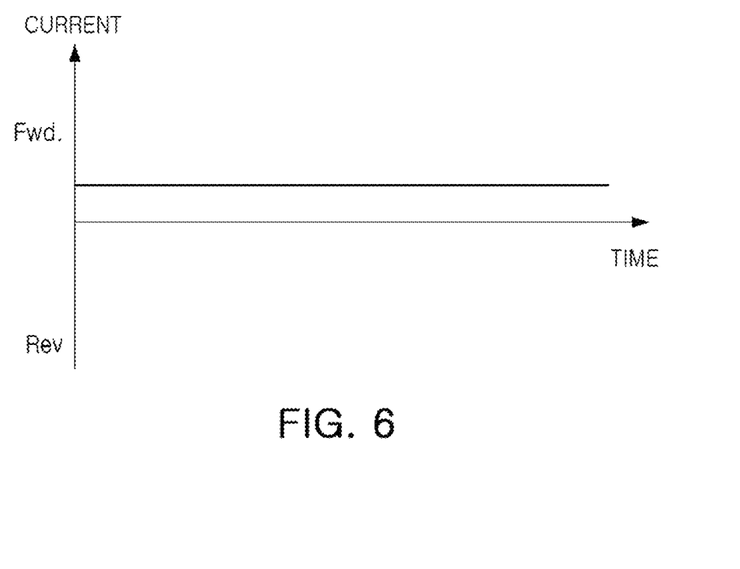
FIG. 6 schematically illustrating a current application profile by a conventional direct current (DC) plating method.

In the prior art, during the manufacturing process of a multilayer ceramic capacitor, when nickel (Ni) plating and tin (Sn) plating are performed on a surface of a chip during burnout, a constant current was applied for a predetermined time by the direct current (DC) application method as illustrated in FIG. 6.

Therefore, there was a problem in that hydrogen generated in a plating reaction continuously permeates from an outside to an inside of the chip during a plating time, and an amount of the accumulated permeating hydrogen ultimately causes IR deterioration.

On the other hand, when periodic pulse reverse (PPR) plating is applied, the electrode plating layers 131a and 132a include a plurality of first crystal grains G1 having a major axis L1 of 0.2 μm or more, and an average ration of the major axis L1 and the minor axis L2 of the plurality of first crystal grains G1 may be easily controlled to satisfy 1:1 to 3:1, and accordingly, reliability due to suppression of hydrogen permeation can be improved.

Figure 7:
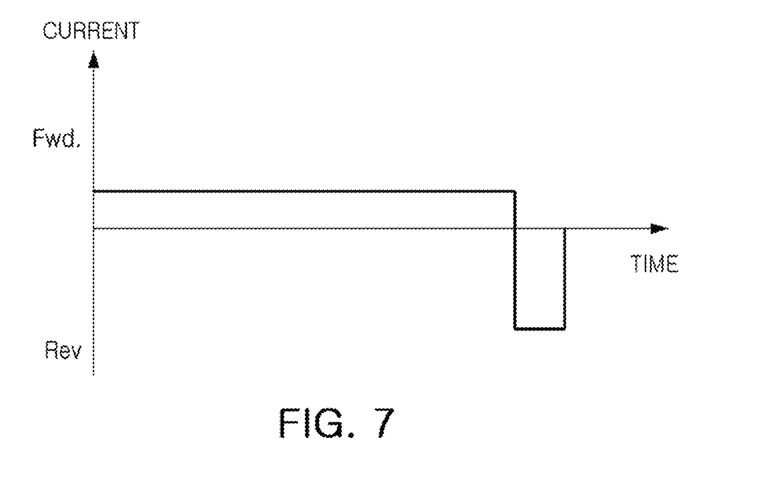
FIG. 7 schematically illustrates a current application profile by a periodic pulse reverse (PPR) plating method according to an embodiment of the present disclosure.

Specifically, unlike the DC current application profile of the prior art as illustrated in FIG. 6, in an embodiment of the present disclosure, a current application profile of a waveform as illustrated in FIG. 7 by periodic pulse reverse (PPR) may be applied. Therefore, hydrogen may be adsorbed during an application time of a forward current in which plating is performed, but the adsorbed hydrogen is desorbed during an application time of a reverse current, making it difficult for hydrogen to permeate thereinto during the plating process. Therefore, using a PPR plating method as compared to the conventional DC plating method, there is an effect of further reducing hydrogen accumulation. In addition, rounded crystal grains may be formed in an electrode plating layer formed by the PPR plating method.

Figure 8:
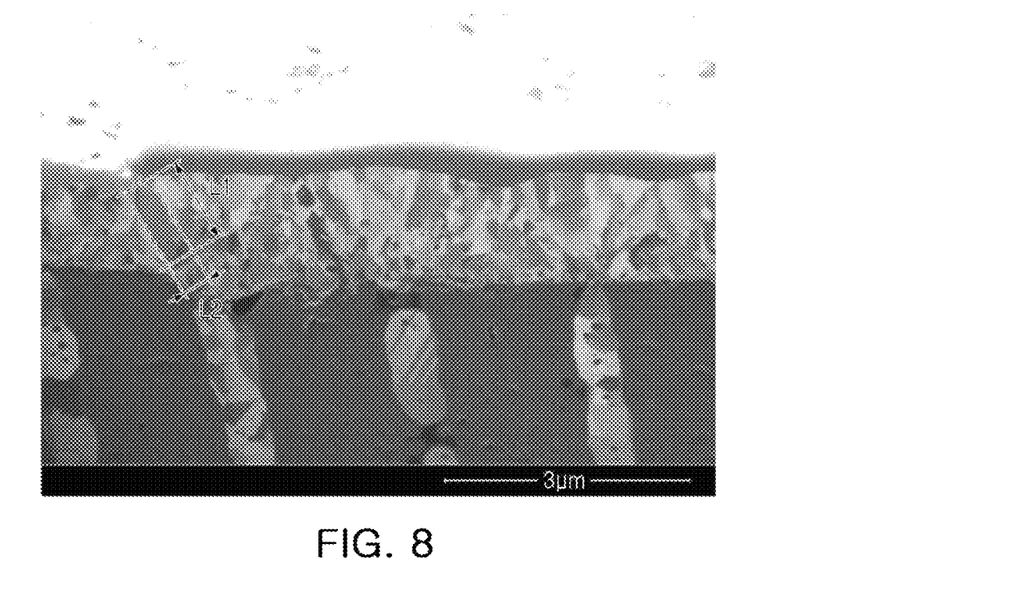
FIG. 8 is an image of a cross-section of an external electrode of Comparative Example using a scanning electron microscope (SEM).
Figure 9:
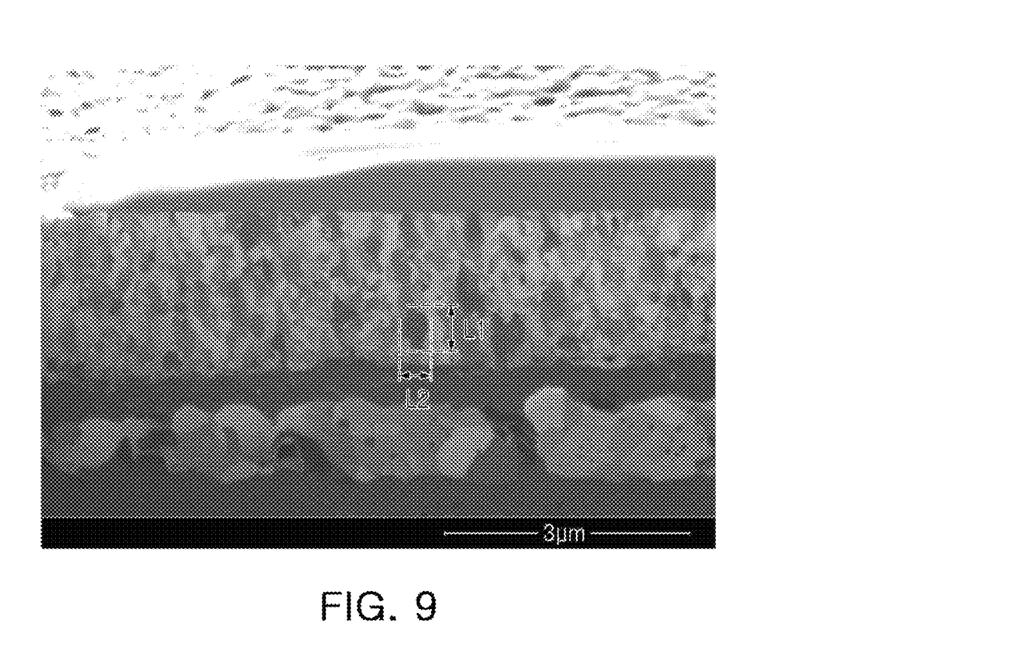
FIG. 9 is an image of a cross-section of an external electrode of Inventive Example using a scanning electron microscope (SEM).

Therefore, in the case of a nickel plating electrode layer formed by applying the PPR plating method according to an embodiment of the present invention, as illustrated in FIG. 9, rounded crystal grains may be included. On the other hand, in the case of a nickel plating electrode layer formed by applying the DC plating method according to the prior art, as illustrated in FIG. 8, a large number of needle-shaped crystal grains may be included.

Hereinafter, conditions for periodic pulse reverse plating according to an embodiment of the present disclosure will be described.

Specifically, as illustrated in FIG. 7, the periodic pulse reverse plating may include a forward current and a reverse current, and may include one or more reverse currents in a waveform. As described above, by including at least one reverse current while including both a forward current and a reverse current, since a process of desorption of hydrogen is necessarily included as compared to the conventional DC method, hydrogen accumulation during the plating process may be more suppressed.

In addition, according to an embodiment of the present disclosure, during periodic pulse reverse plating, forward current density may satisfy 0.5 to 20 ASD, and reverse current density may satisfy 0.1 to 20 ASD.

In addition, according to an embodiment of the present disclosure, a ratio (Tf/Tr) of the forward current to a time (Tf) of the forward current to the time (Tr) of the reverse current may satisfy the range of 2 to 50. When the ratio (Tf/Tr) is less than 2, a problem of loss of external electrodes may occur. On the other hand, when the ratio (Tf/Tr) exceeds 50, a problem may occur in a hydrogen permeation suppression effect.

In addition, according to an embodiment of the present disclosure, intensity of the reverse current may be greater than intensity of the forward current.

By forming an electrode plating layer to satisfy the above-described conditions, a shape of the crystal grains of the electrode plating layer, a distribution of the crystal grains, and the like, and high-temperature reliability by suppressing hydrogen permeation may be secured.

According to an embodiment of the present disclosure, as illustrated in FIG. 7, periodic pulse reverse plating may be continuously performed until the plating is completed, and the periodic pulse reverse plating may be performed without a separate off-time for setting current to '0' until the plating is completed.

In addition, according to an embodiment of the present disclosure, the periodic pulse reverse plating may be barrel plating, and a rotational speed of a barrel may be in a range of 5 to 30 rpm. If the rotational speed of the barrel is less than 5 rpm or the rotational speed of the barrel exceeds 30 rpm, a phenomenon in which chips stick to each other may occur and there may be a problem in thickness distribution.

In this case, except for the above description, general information in the art may be equally applied to barrel plating.

In addition, according to an embodiment of the present disclosure, an operation of performing a heat treatment at 120 to 200° C. after periodic pulse reverse plating, may be further included. After the plating, by performing an additional post-treatment in the above-described high temperature range, it is possible to secure an annealing effect in a plating layer and an effect of removing moisture in the plating layer or recovering capacitance.

Meanwhile, the plating layers 131b and 132b may be disposed on the electrode plating layers 131a and 132a. The plating layers 131b and 132b may be disposed to contact the electrode plating layers 131a and 132a.

The plating layers 131b and 132b serve to improve mounting characteristics. A type of the plating layers 131b and 132b is not particularly limited, and may be a plating layer containing at least one of Sn, Pd, and alloys thereof.

An average thickness of the plating layers 131b and 132b is not particularly limited, and may be, for example, 2 μm or more and 10 μm or less.

A size of the multilayer electronic component 100 does not need to be particularly limited.

However, to achieve both miniaturization and high capacitance, the number of laminated layers should be increased by thinning a dielectric layer and internal electrodes. A reliability improvement effect according to the present disclosure may become more remarkable in the multilayer electronic component 100 having a size of 1005 (length×width, 1.0 mm×0.5 mm) or less.

Accordingly, when the multilayer electronic component 100 has a length of 1.1 mm or less and a width of 0.55 mm or less in consideration of a manufacturing error and a size of an external electrode, a reliability improvement effect according to the present disclosure may be more remarkable.

The length of the multilayer electronic component 100 may refer to a size of the multilayer electronic component 100 in the second direction, and the width of the multilayer electronic component 100 may refer to a size of the multilayer electronic component 100 in the third direction.

Figure 10:
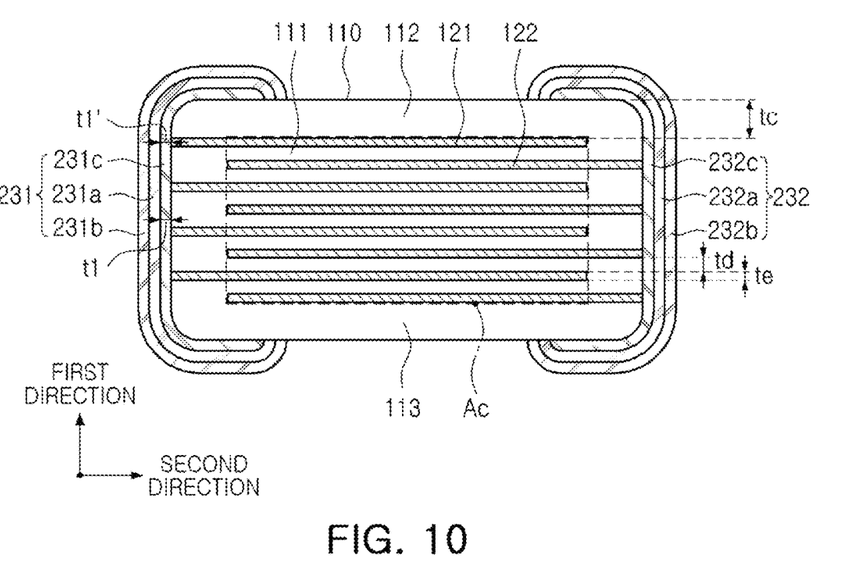
FIG. 10 schematically illustrates first and second cross-sections of a multilayer electronic component according to another embodiment of the present disclosure.

FIG. 10 schematically illustrates a cross-section of a multilayer electronic component in first and second directions according to another embodiment of the present disclosure.

Hereinafter, a multilayer electronic component according to another embodiment of the present disclosure will be described in detail with reference to FIG. 10. However, except that base electrode layers 231c and 232c are disposed between the electrode plating layers 231a and 232a and the body 110, since descriptions of the above-described plating electrode layers 131a and 132a may be applied, descriptions overlapping those described above will be omitted. In addition, descriptions of the body 110, the internal electrodes 121 and 122, and the plating layers 232b and 232c as well as those overlapping with those described above will be omitted.

According to another aspect of the present disclosure, a multilayer electronic component may include a body 110 including a dielectric layer 111 and internal electrodes 121 and 122; and external electrodes 231 and 232 disposed on the body and including base electrode layers 231c and 232c disposed to at least partially contact the internal electrodes, plating electrode layers 231a and 232a disposed on the base electrode layers 231c and 232c, and plating layers 231b and 232b disposed on the electrode plating layers 231a and 232a. An area occupied by metal in the base electrode layers 231c and 232c may be 90% or more, and the electrode plating layers 231a and 232a may include a plurality of first crystal grains G1 having a size of 0.2 µm or more, and the plurality of first crystal grains G1 may have an average ratio of a major axis to a minor axis of 1:1 to 3:1.

The base electrode layers 231c and 232c may serve to electrically connect the internal electrodes 121 and 122 and the external electrodes 131 and 132. In addition, the base electrode layers 231c and 232c may serve to prevent moisture, a plating solution, and the like from permeating into the body 110.

The base electrode layers 231c and 232c may be disposed on the body 110 and may be disposed to at least partially contact the internal electrodes 121 and 122. The first base electrode layer 231c may be disposed to at least partially contact the first internal electrode 121, and the second base electrode layer 232c may be disposed to at least partially contact the second internal electrode 122.

In the base electrode layers 231c and 232c, an area ratio occupied by metal may be 90% or more. In this case, the area ratio occupied by the metal may be measured in a cross-section of the base electrode layers 231c and 232c in first and second directions.

Accordingly, it is easy to form a thickness of the base electrode layers 231c and 232c thin, thereby improving the moisture resistance reliability of the multilayer electronic component 100 and improving the capacitance per unit volume. More preferably, in the base electrode layers 231c and 232c, an area ratio occupied by metal in the cross-sections thereof in the first and second directions may be 95% or more. That is, the first and second thin film electrode layers 131b and 132b may be substantially formed of metal.

After being polished to a center of the multilayer electronic component in a third direction, to expose a cross-section of the base electrode layers 231c and 232c in first and second directions, the area ratio occupied by the metal of the base electrode layers 231c and 232c may be measured by analyzing an image obtained by scanning the cross-section with a scanning electron microscope (SEM).

In an embodiment, an average thickness of the base electrode layers 231c and 232c may be greater than or equal to 1 µm and less than or equal to 10 µm. When the average thickness of the base electrode layers 231c and 232c is less than 1 µm, an effect of preventing permeation of a plating solution, moisture, and the like, may be insufficient, and when the average thickness exceeds 10 µm, there may be a concern that a capacitance improvement effect per unit volume is insufficient.

After being polished to a center of the multilayer electronic component in a third direction, to expose a cross-section of the base electrode layers 231c and 232c in first and second directions, the average thickness of the base electrode layers 231c and 232c may be measured by analyzing an image obtained by scanning the cross-section with a scanning electron microscope (SEM). Specifically, it can be measured by obtaining an average value for each thickness of 10 equally spaced points in the image.

A method of forming the base electrode layers 231c and 232c is not particularly limited, but in order to form the base electrode layers 231c and 232c thinly and densely, the base electrode layers 231c and 232c may be formed by a sputtering method, an atomic layer deposition method, or the like. In an embodiment, the base electrode layers 231c and 232c may be sputtering layers. Since the base electrode layers 231c and 232c are sputtering layers formed using a sputtering method, it is easy to form the base electrode layers 231c and 232c thin, thereby improving moisture resistance reliability of the multilayer electronic component and improving capacitance per unit volume. Specifically, metal constituting the base electrode layers 231c and 232c may be discharged in an atomic or ionic state and deposited on the body 110 to form thin film electrode layers 131b and 132b.

A material of forming the base electrode layers 231c and 232c may be formed using any material as long as it has electrical conductivity, and a specific material may be determined in consideration of electrical characteristics and the like. For example, the base electrode layers 231c and 232c may be at least one of nickel (Ni), copper (Cu), chromium (Cr), silver (Ag), gold (Au), platinum (Pt), palladium (Pd), and alloys thereof. As a more preferable example, the base electrode layers 231c and 232c may be one of copper (Cu), chromium (Cr), and Ni—Cr, but an embodiment thereof is not limited thereto. In an embodiment, the dielectric layer 111 and the internal electrodes 121 and 122 are alternately disposed in a first direction, and when a size of the base electrode layers 231c and 232c measured in a center of the body 110 in the first direction, in a second direction is t1, and when a size of the base electrode layers 231c and 232c in the second direction measured in an internal electrode disposed in an outermost portion in the first direction is t1', t1'/t1 may be 0.9 or more and 1.1 or less. As the base electrode layers 231c and 232c are formed by a sputtering method, the base electrode layers 231c and 232c may have a uniform thickness, and t1'/t1 may be easily controlled to be 0.9 or more and 1.1 or less.

Hereinafter, the present disclosure will be described in more detail through examples. However, it should be noted that the following examples are only for explaining the present disclosure through examples, and are not intended to limit the scope of the present disclosure. This is because the scope of the present disclosure is determined by the matters described in the claims and the matters reasonably inferred therefrom.

Example

Under same conditions as for Comparative Example and Inventive Example, a ceramic paste was formed, a ceramic green sheet was formed on a PET film using the same, and Ni internal electrode paste was printed on the ceramic green sheet, and laminated alternately as illustrated in FIG. 4. Thus, a laminate was formed.

Subsequently, after sintering the laminate to obtain a body, Ni plating was performed on the body, and an electrode plating layer was formed by applying DC plating for Comparative Example and PPR plating for Inventive Example. After the plating, post-heat treatment was performed at 160° C. for 1 hour at a high temperature, to obtain a sample chip.

In order to check a shape of crystal grains of the electrode plating layer, cross-sectional specimens of the sample chips of Comparative Examples and Inventive Examples were prepared. Then, after a surface thereof was etched with FIB (Focused Ion Beam) equipment, a major axis and a minor axis of Ni crystal grains were measured using a scanning electron microscope (SEM) by applying 30 KV, 50,000 times magnification, and a SE MODE. In this case, after selecting 10 crystal grains in an order of size, a major axis and a minor axis of the 10 crystal grains were measured, respectively, and an average value of a ratio of the major axis to the minor axis was obtained and illustrated in Tables 1 and 2 below.

TABLE 1

Comparative Example

| Division | Major axis (μm) | Minor axis (μm) | Major axis/ Minor axis | Major axis:Minor axis |
|---|---|---|---|---|
| 1 | 1.15 | 0.47 | 2.45 | 2.45:1 |
| 2 | 1.38 | 0.12 | 11.66 | 11.66:1 |
| 3 | 1.38 | 0.17 | 7.95 | 7.95:1 |
| 4 | 1.21 | 0.26 | 4.61 | 4.61:1 |
| 5 | 1.31 | 0.35 | 3.74 | 3.74:1 |
| 6 | 1.25 | 0.20 | 6.22 | 6.22:1 |
| 7 | 1.04 | 0.18 | 5.95 | 5.95:1 |
| 8 | 1.14 | 0.20 | 5.67 | 5.67:1 |
| 9 | 0.92 | 0.33 | 2.80 | 2.80:1 |
| 10 | 1.00 | 0.21 | 4.71 | 4.71:1 |
| Average value | 1.18 | 0.25 | 5.58 | 5.58:1 |

TABLE 2

Inventive Example

| Division | Major axis (μm) | Minor axis (μm) | Major axis/ Minor axis | Major axis:Minor axis |
|---|---|---|---|---|
| 1 | 0.80 | 0.32 | 2.49 | 2.49:1 |
| 2 | 0.58 | 0.32 | 1.81 | 1.81:1 |
| 3 | 0.88 | 0.20 | 4.37 | 4.37:1 |
| 4 | 0.54 | 0.28 | 1.89 | 1.89:1 |
| 5 | 0.56 | 0.37 | 1.54 | 1.54:1 |
| 6 | 0.46 | 0.48 | 0.96 | 0.96:1 |
| 7 | 0.71 | 0.29 | 2.44 | 2.44:1 |
| 8 | 0.32 | 0.24 | 1.33 | 1.33:1 |
| 9 | 0.31 | 0.33 | 0.95 | 0.95:1 |
| 10 | 0.72 | 0.36 | 1.97 | 1.97:1 |
| Average value | 0.59 | 0.32 | 1.97 | 1.97:1 |

Referring to Table 1 and FIG. 8, which is an image scanned with a scanning electron microscope (SEM) of an external electrode cross-section of Comparative Example, in the case of Comparative Example, it can be confirmed that a large number of needle-shaped crystal grains in which a major axis L1 is greater than a minor axis L2 were observed, and an average ratio of the major axis L1 to the minor axis L2 was measured to be 5.58:1.

On the other hand, referring to Table 2 and FIG. 9, which is an image scanned with a scanning electron microscope (SEM) of an external electrode cross-section of Inventive Example, in the case of Inventive Example, it can be confirmed that a difference between a major axis L1 and a minor axis L2 was not large, so a large number of round crystal grains were observed, and it can be confirmed that a deviation of a ratio of the major axis to the minor axis was small, and an average ratio of the major axis L1 to the minor axis L2 was measured to be 1.97:1.

Moisture resistance reliability of Inventive Examples and Comparative Examples was evaluated and illustrated in Table 3 below. As For moisture resistance reliability evaluation, after 40 sample chips were prepared for each of Inventive Examples and Comparative Example, a voltage of 15V was applied for 4 hours under a condition at a temperature of 85° C. and humidity of 85%, and then insulation resistance was measured, so that the number of sample chips corresponding to the insulation resistance of less than $10^6\Omega$, $10^6$ to $10^7\Omega$, and exceeding $10^7\Omega$ was described.

TABLE 3

| Division | Less than $10^6\Omega$ | $10^6$ to $10^7\Omega$ | Exceeding $10^7\Omega$ |
|---|---|---|---|
| Inventive Example | 3 | 2 | 35 |
| Comparative Example | 10 | 11 | 19 |

It can be confirmed that the number of chips whose insulation resistance was measured to be less than $10^6\Omega$ was only 3 in the case of Inventive Example, while a significant difference occurred in terms of moisture resistance reliability, in the case of Comparative Example.

In addition, in the case of Comparative Example, the number of chips whose insulation resistance was measured to be $10^7\Omega$ or less was 21, and IR Drop occurred in most of the sample chips, while the number of chips whose insulation resistance was measured to be $10^7\Omega$ or less was 5 in the case of Inventive Example and IR drop did not occur in most of the sample chips, and it can be confirmed that a significant difference occurred in terms of moisture resistance reliability.

As set forth above, as one of the various effects of the present disclosure, reliability of a multilayer electronic component may be improved by suppressing hydrogen permeation by controlling a shape of crystal grains of the electrode plating layer.

As one of the various effects of the present disclosure, capacitance per unit volume of the multilayer electronic component may be improved.

Although the embodiments of the present disclosure have been described in detail above, the present disclosure is not limited by the above-described embodiments and the accompanying drawings, and is intended to be limited by the appended claims. Therefore, various forms of substitution, modification, and change will be possible by those skilled in the art within the scope of the technical spirit of the present disclosure described in the claims, which also falls within the scope of the present disclosure.

In addition, the expression 'one embodiment' used in the present disclosure does not mean the same embodiment, and is provided to emphasize and describe different unique characteristics. However, one embodiment presented above is not excluded from being implemented in combination with features of another embodiment. For example, even if a matter described in one specific embodiment is not described in another embodiment, it can be understood as a description related to another embodiment, unless there is a description contradicting or contradicting the matter in the other embodiment.

Terms used in this disclosure are only used to describe one embodiment, and are not intended to limit the disclosure. In this case, singular expressions include plural expressions unless the context clearly indicates otherwise.

While example embodiments have been shown and described above, it will be apparent to those skilled in the art that modifications and variations could be made without departing from the scope of the present invention as defined by the appended claims.

What is claimed is:

1. A multilayer electronic component, comprising:
a body including a dielectric layer and internal electrodes; and
an external electrode disposed on the body and including an electrode plating layer disposed to at least partially directly contact the internal electrodes and a plating layer disposed on the electrode plating layer,
wherein the electrode plating layer includes a plurality of first crystal grains having a major axis of 0.2 μm or more, and
the plurality of first crystal grains have an average ratio of a major axis to a minor axis of 1:1 to 3:1.

2. The multilayer electronic component of claim 1, wherein the plurality of first crystal grains have a major axis of 0.3 μm or more, the plurality of first crystal grains having an average ratio of a major axis to a minor axis of 1:1 to 2:1.

3. The multilayer electronic component of claim 1, wherein the number of the plurality of first crystal grains having a major axis of 0.2 μm or more in a 10 μm×2 μm region of a cross-section of the electrode plating layer is 10 or more, the 10 or more first crystal grains having an average ratio of a major axis to a minor axis of 1:1 to 3:1.

4. The multilayer electronic component of claim 1, wherein the number of the plurality of first crystal grains having a major axis of 0.3 μm or more in a 10 μm×2 μm region of a cross-section of the electrode plating layer is 10 or more, the 10 or more first crystal grains having an average ratio of a major axis to a minor axis of 1:1 to 2:1.

5. The multilayer electronic component of claim 1, wherein the major axis represents a maximum diameter of the plurality of first crystal grains, and
the minor axis represents a maximum diameter measured in a direction, perpendicular to a measurement direction of the major axis.

6. The multilayer electronic component of claim 1, wherein a ratio of the number of the plurality of first crystal grains among crystal grains included in the electrode plating layer is 50% or more.

7. The multilayer electronic component of claim 1, wherein the plurality of first crystal grains include an Ni crystal grain.

8. The multilayer electronic component of claim 1, wherein an average size of crystal grains included in the electrode plating layer is 0.3 μm or more and 1.5 μm or less.

9. The multilayer electronic component of claim 1, wherein an average thickness of the electrode plating layer is 1 μm or more and 10 μm or less.

10. The multilayer electronic component of claim 1, wherein the electrode plating layer is formed using a periodic pulse reverse plating method.

11. The multilayer electronic component of claim 1, wherein the plating layer includes a Sn plating layer.

12. The multilayer electronic component of claim 1, wherein an average thickness of the plating layer is 2 μm or more and 10 μm or less.

13. The multilayer electronic component of claim 1, wherein an average thickness of the dielectric layer is 0.35 μm or less.

14. The multilayer electronic component of claim 1, wherein an average thickness of one of the internal electrodes is 0.35 μm or less.

15. A multilayer electronic component, comprising:
a body including a dielectric layer and internal electrodes; and
an external electrode disposed on the body and including a base electrode layer disposed to at least partially contact the internal electrodes, an electrode plating layer disposed on the base electrode layer, and a plating layer disposed on the electrode plating layer,
wherein an area occupied by metal among the base electrode layers is 90% or more,
the electrode plating layer includes a plurality of first crystal grains having a major axis of 0.2 μm or more, and
the plurality of first crystal grains have an average ratio of a major axis to a minor axis of 1:1 to 3:1.

16. The multilayer electronic component of claim 15, wherein an average thickness of the base electrode layer is 1 μm or more and 10 μm or less.

17. The multilayer electronic component of claim 15, wherein the dielectric layer and an internal electrode are alternately disposed in a first direction, and
a size of the base electrode layer in a second direction, measured in a center of the body in the first direction is t1, a size of the base electrode layer in a second direction, measured in an internal electrode disposed in an outermost portion in the first direction is t1', and t1'/t1 is 0.9 or more and 1.1 or less.

18. The multilayer electronic component of claim 15, wherein the base electrode layer includes a sputtering layer.

19. The multilayer electronic component of claim 15, wherein the number of the plurality of first crystal grains having a major axis of 0.2 μm or more in a 10 μm×2 μm region of a cross-section of the electrode plating layer is 10 or more, the 10 or more first crystal grains having an average ratio of a major axis to a minor axis of 1:1 to 3:1.

20. The multilayer electronic component of claim 15, wherein an average thickness of the electrode plating layer is 1 μm or more and 10 μm or less, and
an average thickness of the plating layer is 2 μm or more and 10 μm or less.

* * * * *